May 25, 1965           R. P. PLOURDE           3,184,793
APPARATUS FOR PRODUCING A CONTINUOUS TUBULAR ARTICLE
Original Filed Aug. 9, 1961
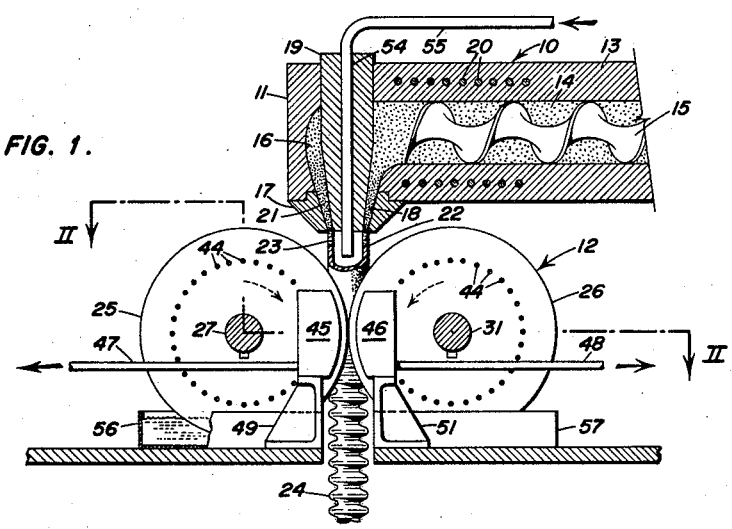
FIG. 1.
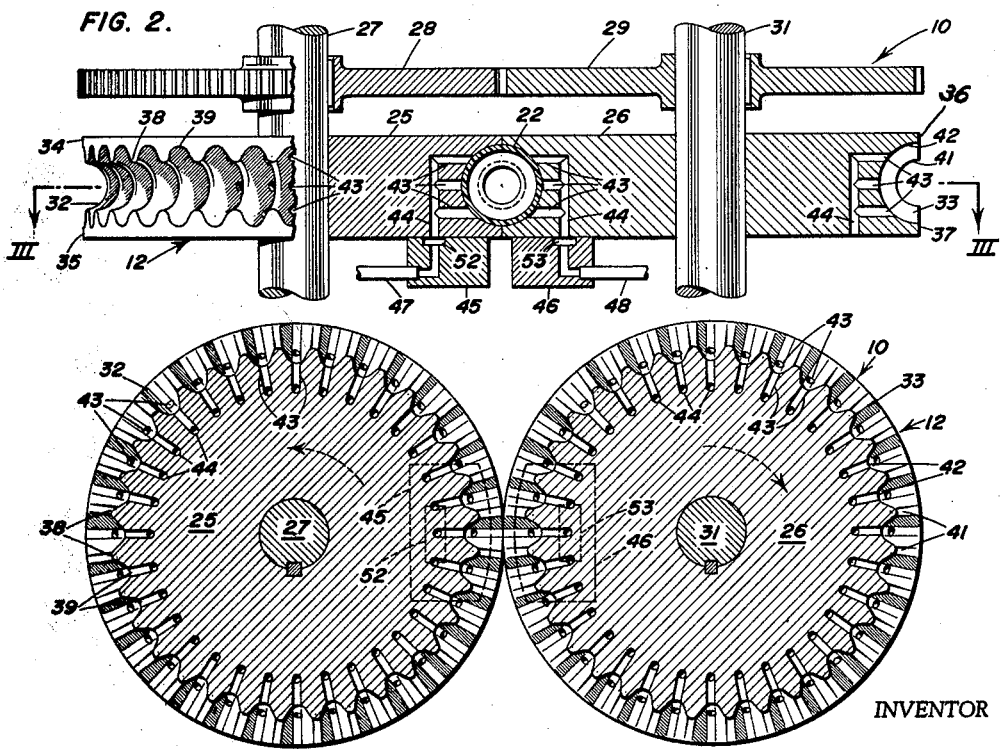
FIG. 2.
FIG. 3.
INVENTOR
ROGER P. PLOURDE
BY *Norman S. Blodgett*
ATTORNEY United States Patent Office 3,184,793
Patented May 25, 1965

3,184,793
APPARATUS FOR PRODUCING A CONTINUOUS TUBULAR ARTICLE
Roger P. Plourde, 68 Maple St., Paxton, Mass.
Continuation of application Ser. No. 130,420, Aug. 9, 1961. This application Apr. 3, 1964, Ser. No. 358,144
1 Claim. (Cl. 18—14)

This in a continuation of patent application Serial Number 130,420, filed August 9, 1961, now abandoned.

This invention relates to apparatus for producing continuous tubular article and, more particularly, to apparatus arranged to produce a corrugated or similar non-extrudable article from a heat-softened seamless tube of plastic.

In the past, there has been considerable demand for a corrugated or flexible hose formed of plastic of sufficient thickness and hardness to be self-supporting and to withstand internal pressures. Such hose would be useful, for instance, in vacuum cleaners where the internal pressure would be a suction, or in automobile cooling system hoses where the pressure is a positive one. While it has been possible to form such hoses in small lengths by a batch process using a mandrel or by blow molding, it has been impossible to do so continuously. The hose at the present time is formed on a mandrel by winding a soft plastic tape around a wire coiled on the mandrel, the wire providing the physical support for the hose. The hose which is formed in this manner is necessarily formed of thin-walled, flexible plastic of very low strength which is easily perforated and torn. The presence of the wire is a handicap in some cases, also. Although the batch process of producing the corrugated tube is adequate for some purposes, generally speaking, it is expensive and it is not possible to use the tube thus formed in automatic machinery which use a continuous length of material and also the length is definitely limited. These and other difficulties experienced with the prior art apparatus have been obviated in a novel manner by the present invention.

It is, therefore, an outstanding object of the invention to provide an apparatus for producing a continuous tubular article from a heat-softened seamless tube of plastic.

Another object of this invention is the provision of an apparatus for producing corrugated plastic tube whose wall thickness and strength is sufficient to support appreciable pressure and still be capable of accepting sharp radius bends; the corrugations also enable a tubing to be produced from a rigid material which, without corrugations, would be a stiff tube or pipe but, with the corrugations, is capable of being bent through the creation of bending moments.

A further object of the present invention is the provision of an apparatus for continuously producing corrugated tubing formed of plastic which apparatus is simple in construction, inexpensive to manufacture, and which is capable of a long life of useful service.

It is another object of the instant invention to provide an apparatus for producing corrugated plastic tubing continuously by a vacuum molding process.

It is a further object of the invention to provide an appartus for producing a non-extrudable continuous article, such as corrugated tubing, by a vacuum molding process whereby a thin wall of considerable strength is obtained.

A still further object of this invention is the provision of an appaartus using a suction molding process for producing intermittent, thin-walled, continuously-linked articles of plastic.

It is a still further object of the present invention to provide an apparatus for producing a corrugated tube from thermoplastic material by a combination of extrusion and vacuum molding.

Another object of the invention is the provision of apparatus for forming corrugated plastic tube, wherein one is given freedom of design, of material, of color, and of configuration of the corrugations.

With these and other objects in view, as will be apparent to those skilled in the art, the invention resides in the combination of parts set forth in the specification and covered by the claim appended hereto.

The character of the invention, however, may be best understood by reference to certain of its structural forms as illustrated by the accompanying drawings in which:

FIG. 1 is an elevational view partly in section of an apparatus embodying the principles of the present invention;

FIG. 2 is a horizontal sectional view of the invention taken on the line II—II of FIG. 1; and FIG. 3 is a vertical sectional view of the apparatus taken on the line III—III of FIG. 2.

Referring first to FIG. 1, which best shows the general features of the invention, the apparatus, indicated by the reference numeral 10, is shown as consisting of an extruder 11 of the cross-head type and a corrugating apparatus 12. The extruder is provided with a housing 13 having a horizontal bore 14 in which resides a material-feeding screw 15, which is rotatable in the usual manner to force plastic through the bore 14. The bore 14 is provided at the end shown in the drawing with a right-angle bore 16 which opens on the downward side of the housing and which is provided with a die 17. The die is provided with a tapered bore 18 having its narrow end at the exterior portion of the die and facing downwardly. Within the bore 16 lies a tapered vertical pin 19 which terminates in the same horizontal plane with the bottom surface of the die 17 and which is exactly concentric with the bore 18. The pin and the bore, therefore, define an annular tapered passage 21 through which the plastic is extruded. In the drawing is shown a tube 22 which has been formed by the extruder 11 and which is formed of a thermoplastic material. As is evident in the drawing, the tube 22 is a straight cylindrical tube in the portion between the extruder 11 and the apparatus 12 and this is known in the art as the parison 23. The portion of the tube 22 lying below the apparatus 12 is the finished product and is a corrugated tube 24.

Referring now to the corrugating apparatus 12, it can be seen that it consists generally of two discs 25 and 26. The disc 25 is mounted for rotation on a shaft 27. To this shaft is keyed a gear 28 which meshes with a similar gear 29 fastened to a shaft 31 on which the disc 26 is also mounted. One of the shafts 27 and 31 is connected to a driving means (not shown), so that the discs 25 and 26 may be driven at a speed commensurate with the formation of the parison 23 by the extruder 11. The discs 25 and 26 are adapted to rotate in opposite senses so that their mating surfaces, which are tangential just below the passage 21, move at the same speed and in the same direction. The peripheries of the discs are formed with large semi-circular grooves; the disc 25 is provided with such a groove 32, while the disc 26 is provided with a groove 33. The groove 32 is formed in what would otherwise be the cylindrical edge of the disc and occupies only part of the disc edge surface, thus leaving cylindrical surfaces 34 and 35 which are tangential with similar surfaces 36 and 37 which remain on the cylindrical edge of the disc 26 after the groove 33 is formed. The surface 34 and the surface 36 are tangential at a point midway between the axles 27 and 31, while the surfaces 35 and 37 are similarly tangential. The grooves 32 and 33 form a perfect circle in the intermediate portion which, as is best shown in FIG. 2, contains the tube 22. Now, the groove 32, in addition to being generally semi-circular, is also formed with lesser indentations. The groove is formed with alternate annular ridges 38 and pockets or grooves 39. The annular ridges and grooves are transverse of the major axis of the groove 32. Similarly, the groove 33 is formed with ridges 41 and grooves 42. The ridges and grooves on the respective discs 25 and 26 are equal in size and shape and when the discs rotate each groove of one disc is matched by an exactly similar groove of the other disc; similarly, each ridge of one disc finds an exactly matching and coincidental ridge on the other disc. Each one of the grooves 39 and 42 of the discs 25 and 26, respectively, is provided with a number of passages or openings 43. These openings extend radially into the disc and each of the series of openings in a given groove intersects a passage 44 which extends to one side of the disc parallel to the shaft. Pressed against the side of the disc 25 upon which all of the passages 44 open is a comutator 45, while a similar commutator 46 is pressed against the side of the disc 26. The commutator 45 is connected by a passage 47 to a source of suction (not shown), while the commutator 46 is similarly connected by a passage 48 to the same source. The commutators, incidentally, are fixed in space on supports 49 and 51 and do not rotate with the discs 25 and 26. The surface of the commutator 45 which engages the radial surface of the disc 25 is provided with a pocket 52 which is large enough to cover approximately two of the passages 44 at any given time and it is located so that half of the pocket is above the line joining the shafts 27 and 31 and half is below that line. Similarly, the commutator 46 is provided with a pocket 53.

Extending through the pin 19 is a thin vertical bore 54 through which passes a tube 55 whose lower end extends well below the top level of the discs 25 and 26 and lies within the tube 22 as it is being extruded. The upper end of the tube 55 is connected to a source of slight positive air pressure (not shown).

The operation of the apparatus will now be readily understood in view of the above description. The plastic material is fed into the extruder 11 and is forced along the bore 14 by the screw 15. The material is forced down the bore 16 around the pin 19 and eventually passes through the die 17. The tapered conformation of the passage 21 between the pin 19 and the surface of the die bore 18 forms the parison 23 of the tube 22. This parison is still thermoplastic because of the heat furnished to the plastic by the heating means 20 embedded in the housing 13 of the extruder. The apparatus 12 is mounted as close to the extruder 11 as is physically possible so that the parison 23 immediately moves between the discs 25 and 26. As it moves downwardly, it is engaged by the grooves 32 and 33 whose surfaces move because of the rotation of the discs 25 and 26 in a downward direction at the same speed as the tube is extruded. As the parison 23 moves downwardly between the discs it is embraced in a general manner by the grooves 32 and 33. As the tube 22 passes through the tangent point on a horizontal line joining the shafts 27 and 31, however, it is definitely formed by the ridges 38 and 41 of the discs 25 and 26, respectively. These ridges form indentations on the tube which extend completely around the tube, while the tube has a tendency to move outwardly and form ridges in the grooves 39 and 42. Now, referring to the openings 43 in the grooves, it can be seen that, as the discs rotate, the passages 44 of a given set of openings eventually pass into the pockets 52 and 53 of the commutators 45 and 46, respectively. The suction in the pockets is carried through to the openings, so that the openings, which in general lie between the shafts 27 and 31, are provided with suction, but none of the other openings are so provided. This means that the tube as it passes through the area between the drive shafts is sucked into the grooves 39 of the disc 25 and the grooves 42 of the disc 26. The outward bulge formed from the tube material is exactly annular and conforms to the shape of the grooves on the disc. Preferably, the diameter of the tube 22 would be selected so that the pitch line of the formed surfaces in the grooves 32 and 33 of the discs is coincidental with the surface of the tube; generally speaking, then, as much material is pressed inwardly by the ridges as would be sucked outwardly by the grooves. The result is the emergence of the corrugated tube 24 from the apparatus 12. The corrugated tube thus formed may be cooled, coiled, or otherwise treated so that it will retain its form permanently. It is contemplated, for instance, that the discs 25 and 26 may be cooled by passing through pans of liquid 56 and 57 or the like.

It will be understood that, although in the preferred embodiment the grooves and ridges in the discs are shown as being smoothly formed of generally circular cross-section and of annular form, they may be square in conformation to form square-sided corrugations on the tube 24. The square shape may, under the teaching of the present invention, involve a square configuration either when a section is taken parallel to the axis or when it is taken at a right angle to the axis; the former may, for instance, resemble a square thread and the latter may resemble a series of boxes joined by a small tube. Other variations of the conformations of the corrugations and shapes of the tube 24 will suggest themselves readily in view of the present invention.

It is obvious that minor changes may be made in the form and construction of the invention without departing from the material spirit thereof; it is not, however, desired to confine the invention to the exact form herein shown and described, but it is desired to include all such as properly come within the scope claimed.

The invention having been thus described, what is claimed as new and desired to secure by Letters Patent is:

Apparatus for producing a continuous corrugated tubular article from a recently-formed seamless tube of plastic, comprising an extruder for forming the tube so that it emerges in a downward direction, at least two rotary dies residing below the extruder on opposite sides of the tube as it emerges from the extruder, the dies being disc-like in form and being mounted for rotation on generally horizontal parallel axes with their peripheries generally tangential, said peripheries being formed with smooth continuous grooves having cooperating forming surfaces consisting of alternate annular ridges and grooves lying in opposition to each other, means for rotating the dies about their axes so that the said surfaces move at the same linear speed as the tube, passages opening on the said surfaces, the passages extending away from the surfaces, said passages terminating with openings at the lateral surface of said discs, said openings positioned to form an annular ring, commutator means as a manifold for applying suction to the passages during a forming portion of the movement of the dies, and means to provide a slight positive pressure in the tube above the dies as it emerges from the extruder to cause the tube to form a seal with the surface of the die.

References Cited by the Examiner
UNITED STATES PATENTS

| | | | |
|---|---|---|---|
| 1,606,270 | 11/26 | Stratford. | |
| 2,497,212 | 2/50 | Donofrio | 18—21 X |
| 2,545,300 | 3/51 | Nixon | 18—14 X |
| 2,760,228 | 8/56 | Verges | 18—14 X |
| 2,866,230 | 12/58 | Holte | 18—19 |
| 2,945,261 | 7/60 | Aykanian et al. | 18—12 X |

WILLIAM J. STEPHENSON, *Primary Examiner.*

MICHAEL V. BRINDISI, *Examiner.*